United States Patent [19]

Dalton, Jr. et al.

[11] 4,320,102

[45] Mar. 16, 1982

[54] METHOD OF STABILIZING HYDROGEN PEROXIDE SOLUTIONS

[75] Inventors: Augustine I. Dalton, Jr., Allentown; Jeffery V. Bauer, Macungie, both of Pa.

[73] Assignee: Air Products and Chemicals, Inc., Allentown, Pa.

[21] Appl. No.: 195,816

[22] Filed: Oct. 10, 1980

[51] Int. Cl.³ .................... C01B 15/037; C01B 15/01; C01B 15/00

[52] U.S. Cl. .................................. 423/273; 423/584; 252/186

[58] Field of Search ................ 252/186; 423/272, 273, 423/584

[56] References Cited

U.S. PATENT DOCUMENTS

| | | | |
|---|---|---|---|
| 2,871,01 | 1/1959 | Rust et al. | 423/272 |
| 1,758,920 | 5/1930 | Baum | 252/186 |
| 2,027,838 | 1/1936 | Reichert | 423/272 |
| 3,194,768 | 7/1965 | Lindner et al. | 423/272 |
| 3,333,925 | 8/1967 | Young | 423/272 |
| 3,336,112 | 8/1967 | Hooper | 423/584 |
| 4,009,252 | 2/1977 | Izumi et al. | 423/584 |

FOREIGN PATENT DOCUMENTS

| | | | |
|---|---|---|---|
| 21845 | 3/1936 | Australia | 423/584 |
| 1111604 | 7/1961 | Fed. Rep. of Germany . | |
| 23676 | of 1908 | United Kingdom | 423/272 |

*Primary Examiner*—Edward J. Meros
*Assistant Examiner*—Margaret B. Medley
*Attorney, Agent, or Firm*—James C. Simmons; E. Eugene Innis

[57] ABSTRACT

A method of stabilizing aqueous hydrogen peroxide solutions against decomposition catalyzed by a combination of iron and copper consists of adding to the solution an amount of alkali metal meta- and pyrophosphates effective to prevent decomposition and adjusting the pH of the solution to 2-4.

8 Claims, 3 Drawing Figures

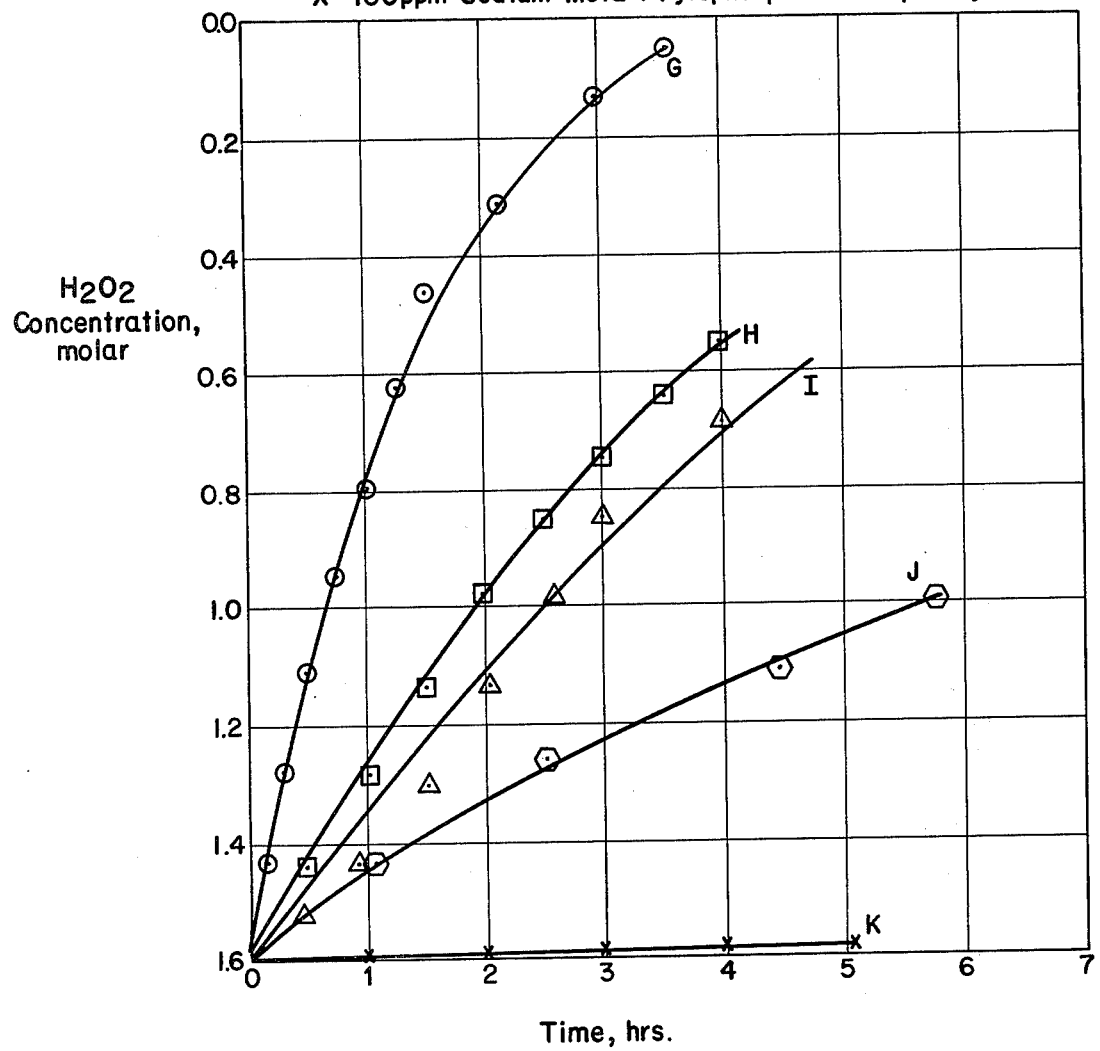

METHOD OF STABILIZING HYDROGEN PEROXIDE SOLUTIONS

BACKGROUND OF THE INVENTION

1. Field of the Invention

The invention relates to a method of stabilizing aqueous hydrogen peroxide solutions against decomposition catalyzed by iron and copper in combination.

2. Prior Art

The use of sequestering agents, including salts of various phosphoric acids, to stabilize solutions of hydrogen peroxide for storage or to decrease the tendency of catalysts used to make hydrogen peroxide from its elements to decompose the hydrogen peroxide thus produced, is well known.

It has been proposed by Benckiser, in German Auslegengschrift No. 1,111,604, to employ a combination of three phosphates, sodium pyrophosphate, sodium tripolyphosphate and sodium heptapolyphosphate to stabilize solutions, pastes or suspensions of hydrogen peroxide kept, at pH 5–8, against decomposition. The ternary combination is disclosed as being more effective than either the pyrophosphate or tripolyphosphate or a 1:1 mixture of both.

Riechert, in U.S. Pat. No. 2,027,838, has proposed stabilizing hydrogen peroxide solutions with pyrophosphoric acid, or the product of an acid and tetrasodium pyrophosphate. Preferably, the solutions are kept at pH 1.5–4.5.

It has been proposed by Rust et al, in U.S. Pat. No. 2,871,101, that stabilizers, including oxyacids of phosphorus and salts thereof, improve the yield of hydrogen peroxide formed by oxidation in a non-aqueous solvent. Alkaline-reacting stabilizers, e.g., trisodium orthophosphate, are said to be particularly effective for the treatment of glass vessels usd as reactors, whereas acidic-reacting stabilizers such as $H_3PO_4$ or $NaH_2PO_4$ are preferred for treatment of aluminum-containing reactors. The reference indicates that ferric, cupric and chromic ions catalyze the decomposition of hydrogen peroxide and that sequestrating hydrogen peroxide stabilizers are selected.

Hooper et al, in U.S. Pat. No. 3,336,112, have proposed the use of various sequestrative stabilizers, including condensed phosphates, for stabilization of aqueous $H_2O_2$ solutions, containing an oxygenated organic compound, against decomposition by supported Group I and Group VIII metal catalysts. The stabilizer is also purported to have a specific activating effect on the catalyst by desorbing metal from the support on which it is introduced so as to yield a particularly reactive colloidal form of the catalytic metal.

Izumi et al, in U.S. Pat. No. 4,009,252, have disclosed that various phosphoric acids and salts are stabilizers against iron-induced decomposition, even in the presence of a palladium catalyst.

It has been proposed by Lindner et al, in U.S. Pat. No. 3,194,768, that a combination of pyrophosphate and ethoxylated phenols stabilize acidic hydrogen peroxide solutions. Aromatic sulfonates are disclosed as pH stabilizing agents in this context.

Baum, in U.S. Pat. No. 1,758,920, also has proposed the use of pyrophosphate, in combination with other materials, to stabilize acid-reacting peroxide solutions.

The use of a quaternary stabilizer containing sodium pyrophosphate, straight chain sodium polymetaphosphate containing 12–17 phosphorus atoms and a combination of stannic and polystannic acids, at pH of 5–8, has been proposed by Young (U.S. Pat. No. 3,333,925) for stabilization against combinations including iron, copper, chromium and manganese.

It will be apparent that stabilization of hydrogen peroxide solutions against decomposition catalyzed by metal ions, particularly an iron-copper combination, introduced during preparation in a metal reaction vessel or during dilution with water containing copper and iron ions has been a significant problem, to which a completely satisfactory solution was heretofore unavailable. In particular, the problem caused by the binary Fe-Cu couple commonly present has not been addressed. Although each of Fe and Cu decompose $H_2O_2$, the combination of Fe and Cu ions is particularly active in a synergistic fashion. Although the prior art proposes ways in which $H_2O_2$ can be stabilized against Fe or Cu- induced decomposition, an effective method of preventing decomposition induced by iron plus copper ions was not previously known.

SUMMARY OF THE INVENTION

This invention relates to a process for stabilizing aqueous hydrogen peroxide solutions against decomposition catalyzed by an iron-copper couple by adding to the solution a mixture of alkali metal pyrophosphate and meta-phosphate in an amount sufficient to prevent decomposition and adjusting the pH of the solution to 2–4.

In another aspect, this invention relates to a stabilized hydrogen peroxide composition containing alkali metal meta- and pyrophosphates and adjusted to pH 2–4, as above.

BRIEF DESCRIPTION OF THE DRAWINGS

FIG. 3 shows the effect of phosphate salts and combination thereof on the decomposition of aqueous hydrogen peroxide solution induced by an iron-copper couple.

DETAILED DESCRIPTION

Decomposition of hydrogen peroxide in aqueous solution by multivalent metal ions has long been a troublesome problem to those who make or handle solutions of hydrogen peroxide. Iron and copper are of special concern owing to their occurrence in common materials of reactor construction, water for dilution and catalyst supports. It is well known that copper and iron, even in the ppm range, will rapidly catalyze decomposition of hydrogen peroxide. See, generally, Baxendale, Adv. Catal., vol. IV (1952) at 31 and Weiss, ibid., at 343. The extreme sensitivity of hydrogen peroxide solutions to metal-catalyzed decomposition becomes very significant because waters used to dilute hydrogen peroxide may, and often do, contain 1 mg iron, 0.2 mg copper, 0.1 mg manganese and 0.02 mg chromium per liter, which amounts are well above those causing rapid decomposition of hydrogen peroxide with economically unacceptable loss of materials and with associated hazards.

Figure 1:
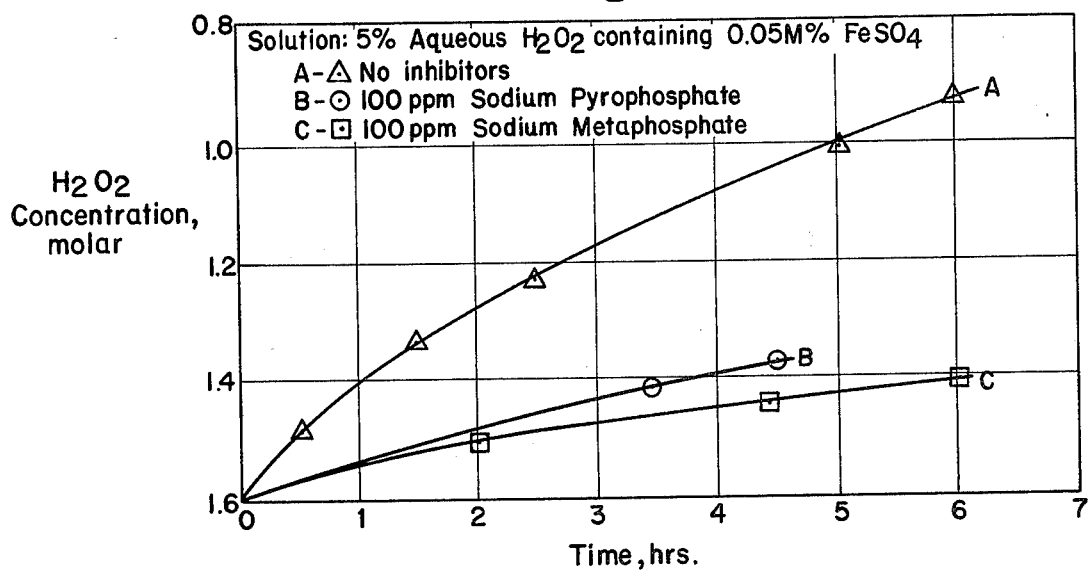
FIG. 1 shows the effect of phosphate salt on iron-catalyzed decomposition of an aqueous hydrogen peroxide solution.
Figure 2:
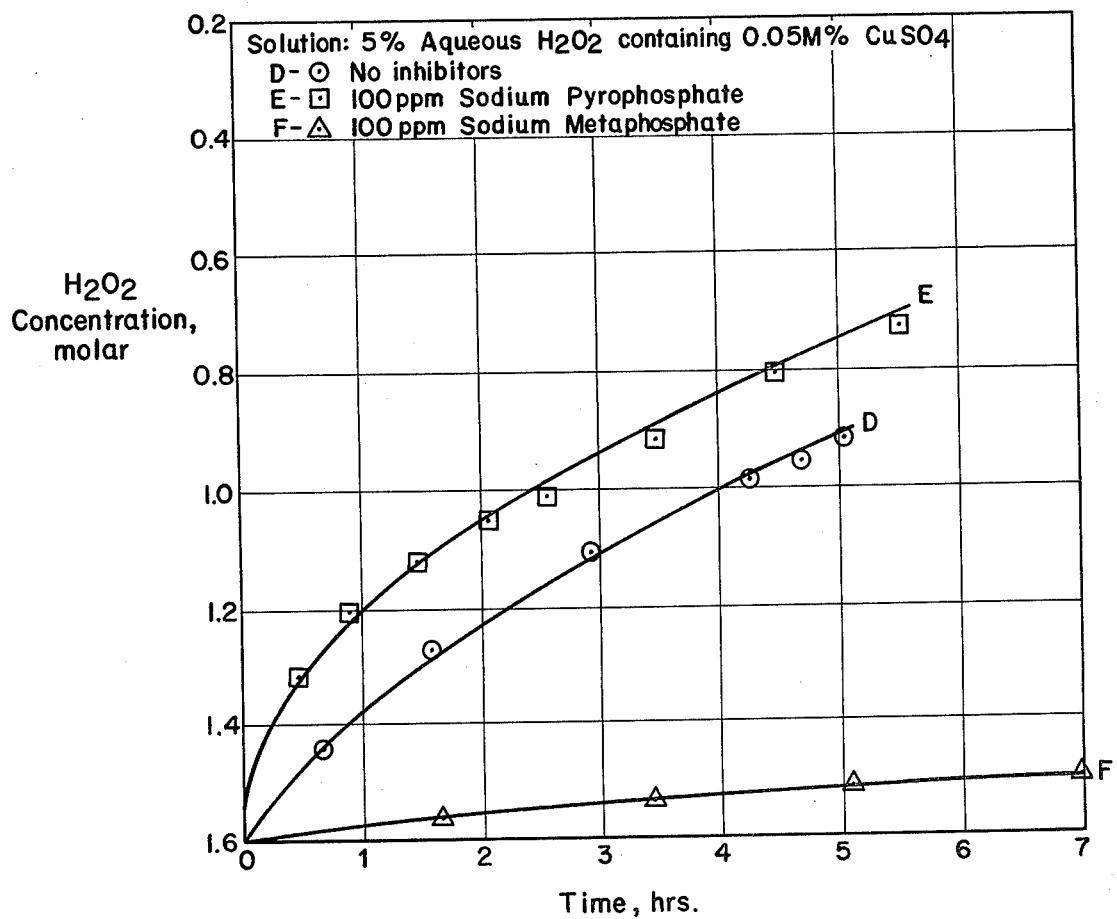
FIG. 2 shows the effect of phosphate salts on copper-catalyzed decomposition of an aqueous hydrogen peroxide solution.

It was found that 5% aqueous hydrogen peroxide (1.6 M) containing 0.05 molar % of $Cu^{++}$ or of $Fe^{++}$ decomposed at 27.7° C. to about 0.9–1.0 M after about 5–6 hours (FIGS. 1 and 2, lines A and D, respectively).

However, a 1:1 mixture of Fe++ and Cu++ (0.025 molar % of each) resulted in essentially complete decomposition of the peroxide (to about 0.05 M) at the end of about 3.5 hr (FIG. 3, line G). See Kremer, *J. Catal.*, Vol. 2 (1962) at 361 for a discussion of the synergistic effect of iron and copper in decomposing hydrogen peroxide.

Whereas addition of either sodium pyrophosphate or sodium metaphosphate at a level of 100 ppm to 5% hydrogen peroxide solutions containing 0.05 molar % of Fe++ slowed decomposition significantly (FIG. 1, lines B, C), addition of 100 ppm of sodium pyrophosphate to 5% hydrogen peroxide solution containing 0.05 molar % copper hardly affected the decomposition rate (FIG. 2, line E). Significant reduction in decomposition induced by the copper ion was obtained only by the addition of 100 ppm of sodium metaphosphate (FIG. 2, line F).

The addition of 100 ppm of either sodium pyrophosphate or metaphosphate alone to 5% aqueous hydrogen peroxide solution containing both Fe++ and Cu++ (0.025 molar % in each) only marginally affected the decomposition of hydrogen peroxide somewhat (FIG. 3, lines H and I), whereas a combination of 100 ppm of sodium pyro- and metaphosphates was surprisingly considerably more effective than either alone for inhibiting decomposition of hydrogen peroxide catalyzed by a combination of Fe++ and Cu++.

Adjusting the pH of the hydrogen peroxide solution containing both Cu++ and Fe++ and both inhibitors to about 3 resulted in essentially complete stabilization never before observed in the prior art. At the end of 5 hr at 27.7° C., the decrease in hydrogen peroxide concentration was scarcely measurable (FIG. 3, line K).

"Aqueous hydrogen peroxide solutions", as used in the specification and claims, includes solutions containing up to about 99% by volume of hydrogen peroxide. However, the principles of this invention will be particularly applicable to solutions containing up to about 75% by volume of hydrogen peroxide.

"Alkali metal" phosphate, as used in the specification and claims, includes sodium, potassium and lithium salts. The sodium salts will generally be preferred. It is to be understood that the active stabilizer ingredient is a combination of phosphate anions, but that in the acidic environment employed in the practice of this invention there will also be present equilibrium concentrations of the corresponding phosphoric acids, which would also be effective as stabilizers.

"Pyrophosphate" means $P_4O_7^=$, i.e., a dimeric material derived from two molecules of $HPO_4^=$, for example, by reaction $$2\ Na_2HPO_4 \xrightarrow{500°\ C.} Na_4P_2O_7 + H_2O$$

"Metaphosphate" means a cyclic condensed product formally derived from metaphosphoric acid or its salts, that is $(NaPO_3)_n$, wherein n is more than 2. See "Phosphoric Acid", vol. 1, Part II, A. V. Slack, editor, Marcel Dekker, Inc., New York (1968) at 987. The metaphosphates used in the practice of this invention can be those wherein n is 3–14.

Owing to the ready availability of the trimer and tetramer, these materials will be preferred.

The metaphosphate and pyrophosphate can be used in ratios of 20:1 to 1:20 by weight, but ratios of 10:1 to 1:10 are preferred. The preferred ratios of meta- to pyrophosphates will, to a considerable extend, depend on the ratio of iron:copper contaminants in the peroxide solution being stabilized. As the copper:iron ratio increases above 1, it is preferred that the metaphosphate:pyrophosphate ratio also be increased above 1.

The amount of combined phosphate inhibitors effective to prevent decomposition by the iron-copper couple can be as low as 1 ppm, up to about 2000 ppm. It will be appreciated that the amount of alkali metal meta- and pyrophosphate mixture required to stabilize peroxide solutions contaminated with iron and copper is a function of the amount of contaminant and that lower levels of the stabilizer combination are effective at low levels of contaminants. It is thought that the effective level of the stabilizer combination is not markedly affected by concentration of peroxide in the solution being stabilized. Generally, levels of 50–500 ppm will be effective and are preferred.

The pH of the hydrogen peroxide solution will be adjusted to 2–4 with any acid which does not itself react with or cause decomposition of hydrogen peroxide. Mineral acids such as hydrochloric acid, perchloric or sulfuric acid are preferred. The best stabilization is attained at pH 2.5–3.5, which is preferred.

It is thought that polyphosphates may inhibit decomposition of hydrogen peroxide either by precipitation or by formation of complex ions.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following Examples, unless otherwise indicated, all parts and percentages are by weight.

EXAMPLE 1

Decomposition of 5% (1.6 M) hydrogen peroxide solution containing 0.05 molar Fe++ (as $FeSO_4$) at 27.7° C. was followed by oxygen gas evolution measured by a modified gas burette technique. Results for hydrogen peroxide solution containing no inhibitor are shown on FIG. 1 (Line A, △).

Runs were made as above with addition of 100 ppm of sodium pyrophosphate (line B, ○) or sodium metaphosphate (line C, □), in which n is 3–4.

EXAMPLE 2

Decomposition of 5% hydrogen peroxide solution containing 0.05 molar % of Cu++ (as $CuSO_4$) was studied as in Example 1.

Results shown on FIG. 2 correspond to the following experimental conditions:

| | | |
|---|---|---|
| (a) no inhibitor | line D, ○ | |
| (b) 100 ppm $Na_4P_2O_7$ | line E, 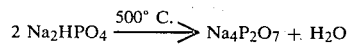 | |
| (c) 100 ppm $(NaPO_3)_n$ n = 3–4 | line F, △ | |

EXAMPLE 3

Synergistic decomposition of 5% hydrogen peroxide by iron-copper at 27.7° C. was studied as in Example 1, following addition of Cu++ (as $CuSO_4$) and Fe++ (as FeSO₄) to a level of 0.025 molar % of each. Results are shown on FIG. 3, line G (⊙).

Use of 100 ppm of sodium metaphosphate (n=3-4) as inhibitor gave the results shown in line H (□) and of 100 ppm of sodium pyrophosphate in line I (△).

EXAMPLE 4

(a) The effect of a combination of sodium meta- and pyrophosphates on decomposition of 5% hydrogen peroxide which was 0.025 M with respect to each of $Cu^{++}$ (as $CuSO_4$) and $Fe^{++}$ (as $FeSO_4$) was measured as above. The solution contained 50 ppm of sodium metaphosphate (n=3-4) and 50 ppm of sodium pyrophosphate. Results are shown on FIG. 3, line J (⊙).

(b) A solution as in Example 4(a) was brought to pH 3.0 by addition of sulfuric acid.

Decomposition of hydrogen peroxide was followed as in Example 1. Results are shown in FIG. 3, line K (X).

What is claimed is:

1. A method of stabilizing aqueous hydrogen peroxide solutions against decomposition catalyzed by a combination of iron and copper consisting of adding to the solution an amount of a combination of alkali metal meta- and pyrophosphates in ratios of 20:1 to 1:20 by weight effective to prevent decomposition and adjusting the pH of the solution to 2-4.

2. The method of claim 1, wherein the alkali metal is sodium.

3. The method of claim 1, wherein the alkali metal metaphosphate is $(NaPO_3)_n$ and n is 3-4.

4. The method of claim 1, wherein the metaphosphate and pyrophosphate are in ratios of 10:1 to 1:10 by weight and the amount of metaphosphate and pyrophosphate in the solution is 50-500 ppm.

5. The method of claim 1, wherein the pH of the solution is adjusted to 2.5-3.5.

6. The method of claim 1, wherein sodium metaphosphate and pyrophosphate are in ratios of 1:10 to 10:1 by weight, the amount of metaphosphate and pyrophosphate in the solution is 50-500 ppm, sodium metaphosphate contains 3-4 $NaPO_3$ units and the pH of the solution is adjusted to 2.5-3.5.

7. An aqueous solution of hydrogen peroxide, free of added stannate, stabilized against decomposition induced by a combination of copper and iron, consisting essentially of up to 99% by volume of hydrogen peroxide and up to about 2000 ppm of a stabilizing combination of alkali metal meta- and pyrophosphates in ratios of 20:1 to 1:20 by weight, wherein the pH of the solution is 2-4.

8. The hydrogen peroxide solution of claim 7, wherein the stabilizing combination is sodium metaphosphate and pyrophosphate in ratios of 1:10 to 10:1, the amount of metaphosphate and pyrophosphate in the solution is 50-500 ppm, sodium metaphosphate contains 3-4 $NaPO_3$ units and the pH of the solution is at 2.5-3.5.

* * * * *